US008005968B2

(12) United States Patent (10) Patent No.: US 8,005,968 B2
Mason et al. (45) Date of Patent: Aug. 23, 2011

(54) SINGLE-INTERFACE DYNAMIC MTU CONTROL

(75) Inventors: Kevin Eugene Mason, Kirkland, WA (US); Carla Dunagan Cetina, Redmond, WA (US); Jeffrey Paul Jensen, San Jose, CA (US); Jonathan Peary Morris, Duvall, WA (US); Roger Duncan Seielstad, Redmond, WA (US); Jimison Samuel Turpin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 42 days.

(21) Appl. No.: 12/474,029

(22) Filed: May 28, 2009

(65) Prior Publication Data

US 2010/0306391 A1 Dec. 2, 2010

(51) Int. Cl.
*G06F 15/16* (2006.01)
(52) U.S. Cl. ........ 709/228; 709/224; 709/230; 370/254; 370/402
(58) Field of Classification Search .................. 709/217, 709/224, 230, 238, 228; 370/254, 389, 402
See application file for complete search history.

(56) References Cited

U.S. PATENT DOCUMENTS

| | | | | |
|---|---|---|---|---|
| 6,003,088 | A * | 12/1999 | Houston et al. | 709/230 |
| 6,014,699 | A * | 1/2000 | Ratcliff et al. | 709/224 |
| 6,999,998 | B2 | 2/2006 | Russell | |
| 7,370,094 | B2 | 5/2008 | Rousseau et al. | |
| 7,483,376 | B2 | 1/2009 | Banerjee | |
| 2003/0185208 | A1 | 10/2003 | Lee | |
| 2004/0218550 | A1* | 11/2004 | Kim | 370/254 |
| 2007/0171828 | A1* | 7/2007 | Dalal et al. | 370/252 |
| 2008/0159150 | A1* | 7/2008 | Ansari | 370/238 |
| 2008/0165775 | A1* | 7/2008 | Das et al. | 370/401 |
| 2008/0298376 | A1 | 12/2008 | Takeda | |

OTHER PUBLICATIONS

Dynamic MTU Determination for IPv6-in-IPv4 Tunnels http://www.watersprings.org/pub/id/draft-templin-tunnelmtu-04.txt, Templin, F., Nov. 20, 2003.
How to Set Up the Proper MTU Size, using a Linksys Router? http://www.testmy.net/t-9044, Oct. 17, 2005.
Responsibilities of the Network Administrator http://docs.sun.com/app/docs/doc/806-0916/6ja85398i?a=view, Apr. 6, 2009.
RFC792—Internet Control Message Protocol http://www.faqs.org/rfcs/rfc792.html, Postel, J., Sep. 1981.
Path MTU Discovery ftp://ftp.rfc-editor.org/in-notes/rfc1191.txt, Mogul et al., Nov. 1990.

* cited by examiner

*Primary Examiner* — Ramy Osman
(74) *Attorney, Agent, or Firm* — Shook Hardy & Bacon, LLP

(57) ABSTRACT

Systems, methods, and computer media for loading initial maximum transmission unit (MTU) information and determining a destination host PMTU are provided. PMTU is the maximum data unit size that can be transmitted from a source host to a destination host because of a limiting component located somewhere in the path. Initial MTU values are determined from local and network sources, including a central repository, and loaded. A PMTU is then determined for a path between a source host and destination host by selecting an MTU value from the available values. If no MTU values are available for a destination host, a default value is used.

18 Claims, 7 Drawing Sheets

SINGLE-INTERFACE DYNAMIC MTU CONTROL

BACKGROUND

Network communication occurs through the transmission of data between computing devices in a network. Data is typically divided into units before transmission to facilitate the communication process. The larger the data units, the faster and more efficient the communication. Each computing device and network has a maximum data unit size, known as a maximum transmission unit (MTU), that it can receive and transmit. The path maximum transmission unit (PMTU) is the MTU that can be successfully sent between a source device and a destination device and depends on the MTU of each computing device and network feature in the path from source to destination. For example, if both a source host and destination host each have an MTU of 9162 bytes, but one device in the path between the source and the destination can only receive and transmit data units of 1518 bytes or less, the PMTU for that path is 1518 bytes.

Because it is the largest data unit size that can be successfully transmitted from a particular source to a particular destination, the PMTU is the optimal data unit transmission size. PMTU, however, is not easily determined, and most network devices currently transmit data units of a small, default size rather than risk transmitting a data unit larger than the PMTU and having the data discarded or lost. While defaulting to a small MTU size greatly increases the likelihood that a particular transmission will be successful, in many cases the default MTU size is smaller than the PMTU, resulting in slower, less efficient transmission than is possible.

Another current strategy for handling an unknown PMTU is to provide two different physical interfaces. One interface handles large MTU networks and the other handles default MTU networks. In such a system, a list of destinations with a large PMTU must be maintained. Additionally, changes in the path for a destination listed as "large PMTU," for example, insertion of a small MTU device, may cause transmission of large data units to fail at the small MTU device even though the destination was previously known to be large PMTU. This approach increases communication complexity and overhead, can still result in failed communication, and significantly increases cost.

A third strategy currently implemented is to transmit data using large MTUs and rely on returned error messages to identify and communicate the MTU of devices in the path. This is typically done through internet control message protocol (ICMP) error messages. ICMP error messages indicate that the data required fragmentation and should be retransmitted at a lower MTU. However, because ICMP error messages can pose a security risk, many networks and hosts block ICMP error messages, thereby preventing communication of the MTU of devices in a particular path.

SUMMARY

Embodiments of the present invention relate to systems, methods, and computer media for loading initial maximum transmission unit (MTU) information and determining a destination host path MTU (PMTU). Using the systems and methods described herein, initial MTU values are loaded on a source host. The MTU values include PMTU values for a destination host as well as MTU values for subnets and networks with an internet protocol (IP) address subnet prefix of the destination host. Both "local" and "network" MTU values are possible entry types. "Local" entries are loaded from a local host file, and "network" entries are loaded from an MTU lookup table on a central repository in the same network as the source host. If a preference is indicated for either "local" or "network," both initial local values and initial network values are loaded. If no preference is indicated, then only network values are initially loaded.

Also using the systems and methods described herein, a destination host PMTU is determined. A source host accesses one or more MTU lookup tables. One MTU lookup table entry corresponding to the IP address subnet prefix of the destination host is selected and the PMTU between the source host and the destination host is set to the entry value. If no MTU lookup table entries correspond to the IP address subnet prefix of the destination host, a default PMTU value is used.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Embodiments of the present invention are described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

As discussed above, PMTU size for a path from a source host to a destination host is often unknown. Because PMTU is unknown, Ethernet networks typically assume a default MTU size of 1518 bytes, which often results in a smaller data unit size than the path can support and slows communication.

Embodiments of the present invention relate to systems, methods, and computer media for loading initial MTU information and determining a destination host PMTU. In accordance with embodiments of the invention, in a network, a central repository is maintained containing MTU information for a number of destinations. The central repository includes a dynamically updated lookup table associating destination hosts, subnets, and networks with an MTU value. The central repository may exchange information with central repositories in other networks, increasing each repository's list of destinations and associated MTUs.

The lookup table in the central repository is initialized for each destination. In the event a destination cannot be initialized, the default MTU is used. The lookup table may be transmitted to each host in the network. When a host prepares to send data to a destination, the host accesses the lookup file to determine whether to use the default MTU or whether there is an exception, whether higher or lower, for the destination. If a specific PMTU for a destination is not available, the host may check the lookup table for more general subnet or network MTU information for the destination. The lookup table in the central repository is dynamically and periodically updated, and updated table values may be transmitted to hosts that store copies of the table. Additionally, servers or hosts receiving ICMP error messages for devices local to the servers or hosts may transmit such information to the central repository.

Figure 1:
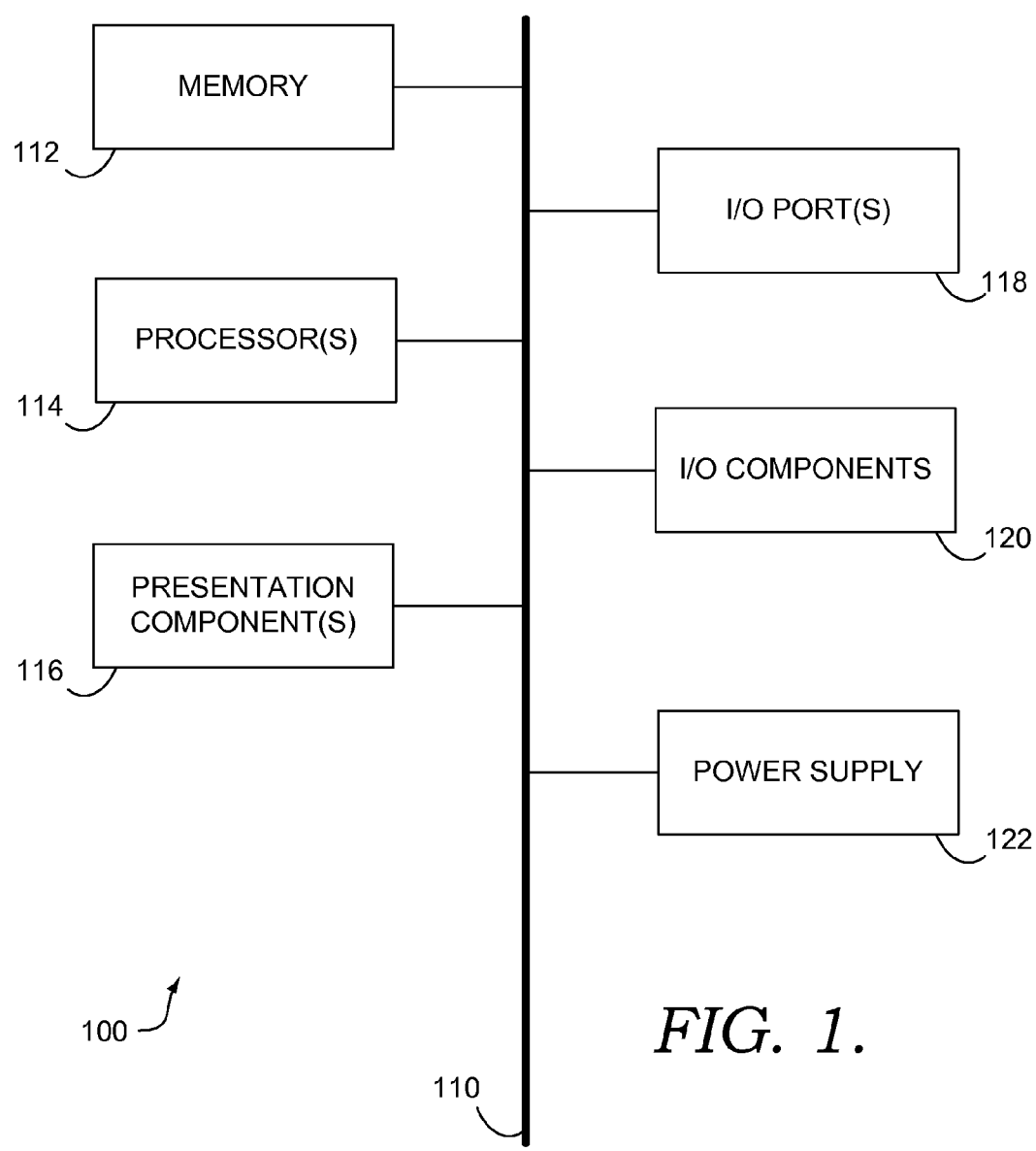
FIG. 1 is a block diagram of an exemplary computing environment suitable for use in implementing the present invention.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, etc. Embodiments of the present invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As discussed previously, embodiments of the present invention provide systems, methods, and computer media for loading initial MTU information and determining a destination host PMTU. Embodiments of the invention will be discussed in reference to FIGS. 2-7.

Figure 2:
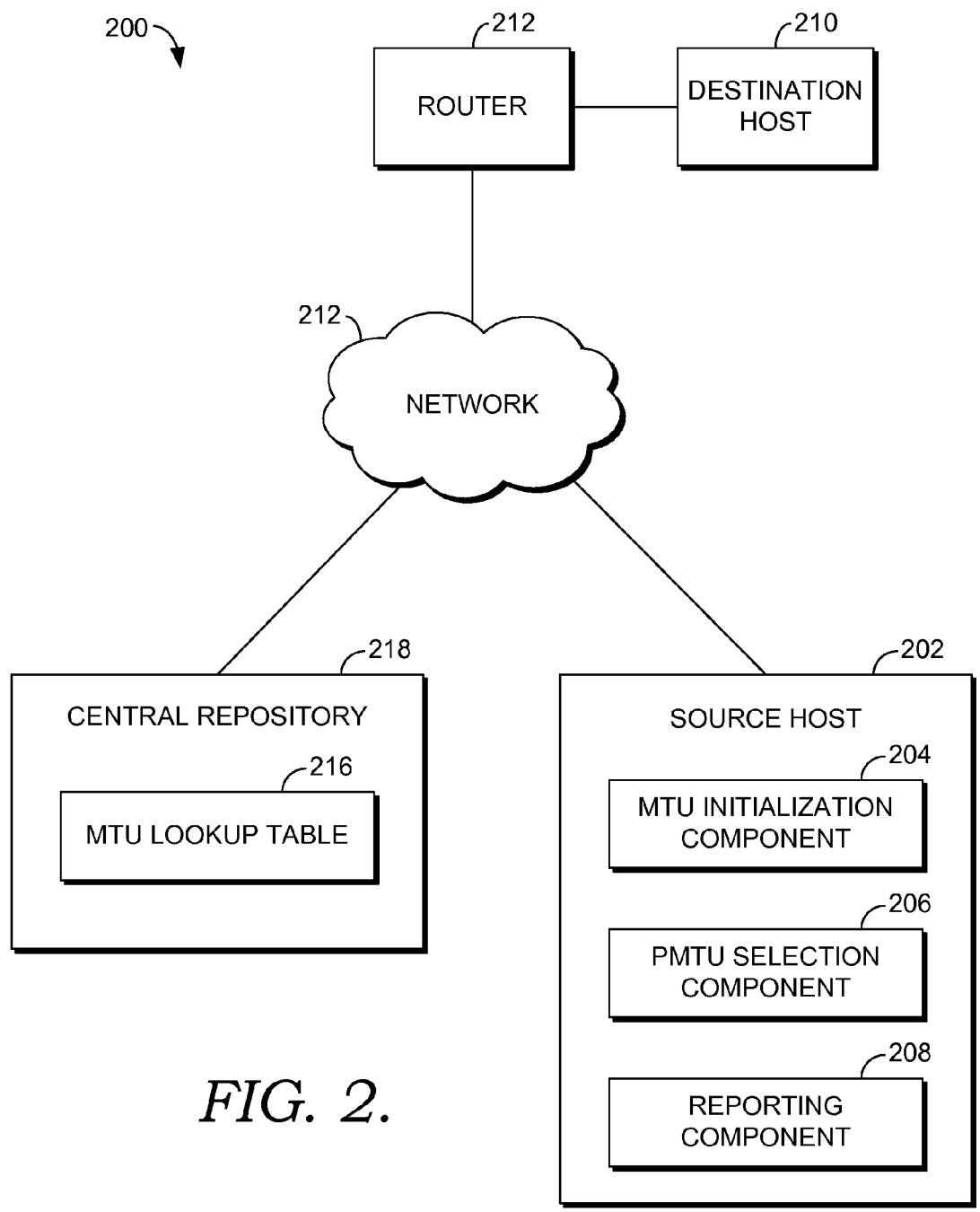
FIG. 2 is a block diagram of a PMTU determination system.

A PTMU determination system 200 is illustrated in FIG. 2. Source host 202 contains an MTU initialization component 204, a PMTU selection component 206, and a reporting component 208. Source host 202 may be a client computer, server computer, or any other computing device that transmits information to other computing devices. MTU initialization component 204 loads local and network MTU information associated with an IP address subnet prefix of a destination host 210. "IP address subnet prefix" of a destination host is used throughout this document to denote any network, subnet, or specific IP address of which a destination host IP address is a subset. For example, for a destination host with an IP address of 202.3.87.4, 202.3.87.XX, 202.3.XX.XX, and 202.XX.XX.XX are all IP address subnet prefixes of the destination host.

Destination host 210 is connected to the network 214 through a router 212. Network 214 may be a local area network (LAN), wide area network (WAN), the Internet, or other type of network. Although only one device (router 212) is shown in the path between source host 202 and destination host 210, it is contemplated that any number of computing devices such as hosts, switches, routers, etc, or network structures such as virtual private networks (VPN) may lie in the path between source host 202 and destination host 210.

As discussed above, source host 202 desires to transmit information to destination host 210 in the largest unit size possible. However, because the MTU of the path (PMTU) between host source 202 and destination source 210 is often unknown, source host 202 seeks to determine the PMTU for the path between source host 202 and destination host 210 before transmitting data. For example, source host 202 may not know the MTU of either router 212 or destination host 210, ordinarily causing source host 202 to transmit data using a default value likely to arrive successfully at destination host 210 without being rejected by a device or network structure in the path. Although any number of communication protocols and standards are possible, in one embodiment, transmission of data occurs through Ethernet frames, which typically have a default transmission unit size of 1518 bytes. In the case of Ethernet, transmission units of up to at least 9162 bytes, referred to as jumbo frames, are possible.

MTU initialization component 204 loads local information from a local host file stored on source component 202 and loads network information from an MTU lookup table 216 stored on a central repository 218. MTU lookup table 216 in central repository 218 contains associations between a network, subnet, or device IP address and an MTU value. MTU lookup table 216 in central repository 218 contains all known MTU data for a particular network or set of networks. The area covered by one central repository is referred to as a "zone." Central repository 218 may be a server, data center, or other computing device. MTU lookup table 216 may be populated in a number of ways, including by receiving broadcasts sent from devices brought online, by manual population, by experimental discovery, and by receiving information from a central repository in a different zone. In some embodiments, different central repositories may share MTU lookup files in order to enable higher PMTU communication between devices in the different networks. Experimental discovery refers to the process of discovering through either sending actual data transmissions or test packets that certain paths have certain MTU values.

PMTU selection component 206 identifies a preferred entry to use as the PMTU between source host 202 and destination host 210 and sets the entry value to be the PMTU value. PMTU selection component 206 may have available local MTU information stored in the local host file as well as network MTU information stored in MTU lookup table 216 of central repository 218. In some embodiments, PMTU selection component 206 reads an indicator to determine which type of entry, either local or network, is preferred. In certain embodiments, the most specific entry of the preferred entry type is selected. "Specific" refers to an IP address with the most complete information. For example, subnet 212.45.6.XX is more specific than 212.45.XX.XX. In some embodiments, the entry type indicator is located in an MTU configuration file.

Reporting component 208 transmits information received in internet control message protocol (ICMP) error messages to central repository 218. As discussed above, ICMP error messages are usually blocked by networks for security purposes. ICMP messages received from points nearby in a network, however, may be received by source host 202 before being blocked. The information contained in received ICMP messages is transmitted to central repository 218 and entered into MTU lookup table 216, where the information is then available for future use.

Figure 3:
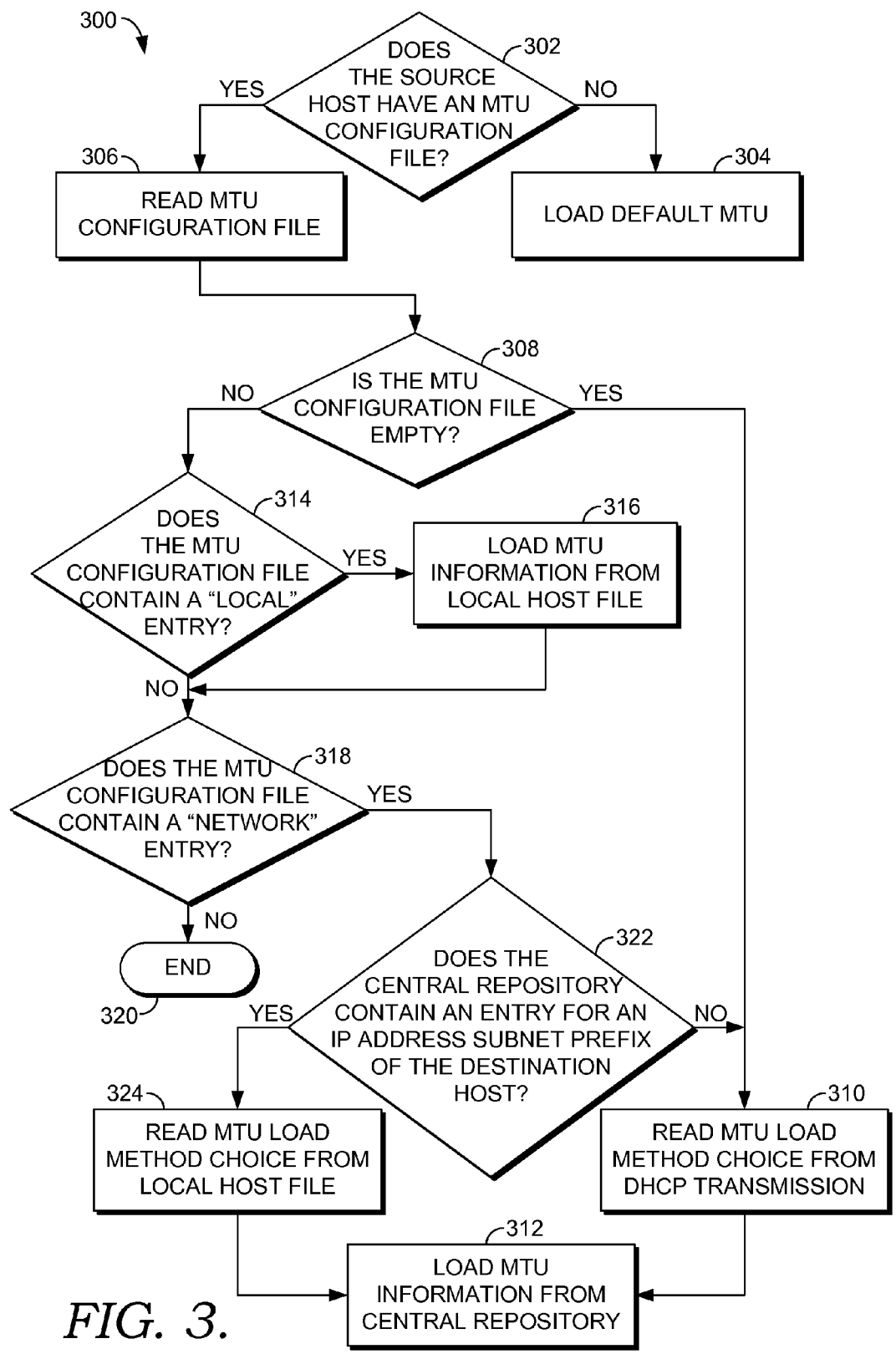
FIG. 3 is a flow chart of a method for loading initial PMTU information.

FIG. 3 illustrates a method 300 for loading initial MTU information. Method 300 may be performed by source host 202 in FIG. 2. In step 302, it is determined whether or not the source host has an MTU configuration file. The MTU configuration file contains an indicator of preferred entry type to aid the source host in selecting an MTU value for the PMTU. Although discussed here as an MTU configuration file, the preferred entry indicator could take a number of forms, including a flag, designated bit value, or other indicator. For explanatory purposes, embodiments of the invention are discussed as including an MTU configuration file, but other embodiments with alternate preferred entry indicators are contemplated. In some embodiments, the MTU configuration file appears as follows:

Network
Local

The contents of the MTU configuration file displayed above are "Network" and "Local." By listing Network first, the file indicates that Network information, retrieved from an MTU lookup table on a central repository, is preferred over local information, retrieved from a local host file. In some embodiments, the MTU configuration file may appear as follows:

Local
Network 172.143.22.18 Unicast

Because "Local" is listed first, the MTU configuration file displayed here indicates that local information is preferred over network information. The IP address indicates that only network MTU information for that IP address is preferred. If neither of the preferred entry types are found, a default value is used. "Unicast" indicates that the unicast method of retrieving information from the MTU lookup table on the central repository is to be used.

If the source host does not have an MTU configuration file, then the default MTU is loaded in step 304. For Ethernet, the default MTU size is typically 1518 bytes. The source host may not have an MTU configuration file for a number of reasons. The file may have been deleted by the network administrator or other party, or the source host may be an older device that has not had PMTU-determination functionality enabled. If the source host has an MTU configuration file, the MTU configuration file is read in step 306.

In step 308, it is determined whether the MTU configuration file is empty. If the configuration file is empty, an MTU load method choice is read from a dynamic host configuration protocol (DHCP) transmission sent by a DHCP server. When hosts are brought online, they request an IP address from the DHCP server. In some embodiments, the DHCP server response, including the assigned IP address, includes an MTU load method choice. MTU information from the MTU lookup table in the central repository is then loaded using the selected method in step 312.

If the MTU configuration file is determined to not be empty in step 308, it is then determined if the MTU configuration file contains a "Local" entry. If an MTU configuration file is not empty, then an administrator or other party has manually entered specific instructions that are to be followed. For example if the file lists "Local," followed by "Network" on the next line, then it is intended that local MTU information is preferred. Without manual intervention, the MTU configuration file remains empty.

If the MTU configuration file contains a "Local" entry, then local MTU information is loaded from the local host file. Whether or not "Local" was an entry, it is then determined in step 318 whether "Network" is an entry in the MTU configuration file. If not, initialization ends in step 320. If "Network" is an entry, it is determined in step 322 whether the MTU lookup table in the central repository contains an entry for an IP address subnet prefix of the destination host. Entries of varying specificity are possible, as discussed above. If the MTU lookup table does not contain a desired entry, then an MTU load method choice is read from a DHCP transmission as previously described in step 310, and MTU information is loaded from the MTU lookup table in the central repository in step 312. If the MTU lookup table does contain a desired entry, then an MTU load method choice is read from the local host file in step 324 and MTU information is loaded from the MTU lookup table in the central repository in step 312. In some embodiments, loaded MTU information, for both MTU information from the local host file and from the central repository, has a time to live (TTL) after which the values must be updated because they are no longer valid. In certain embodiments, the TTL defaults to about approximately 300 seconds.

Figure 4:
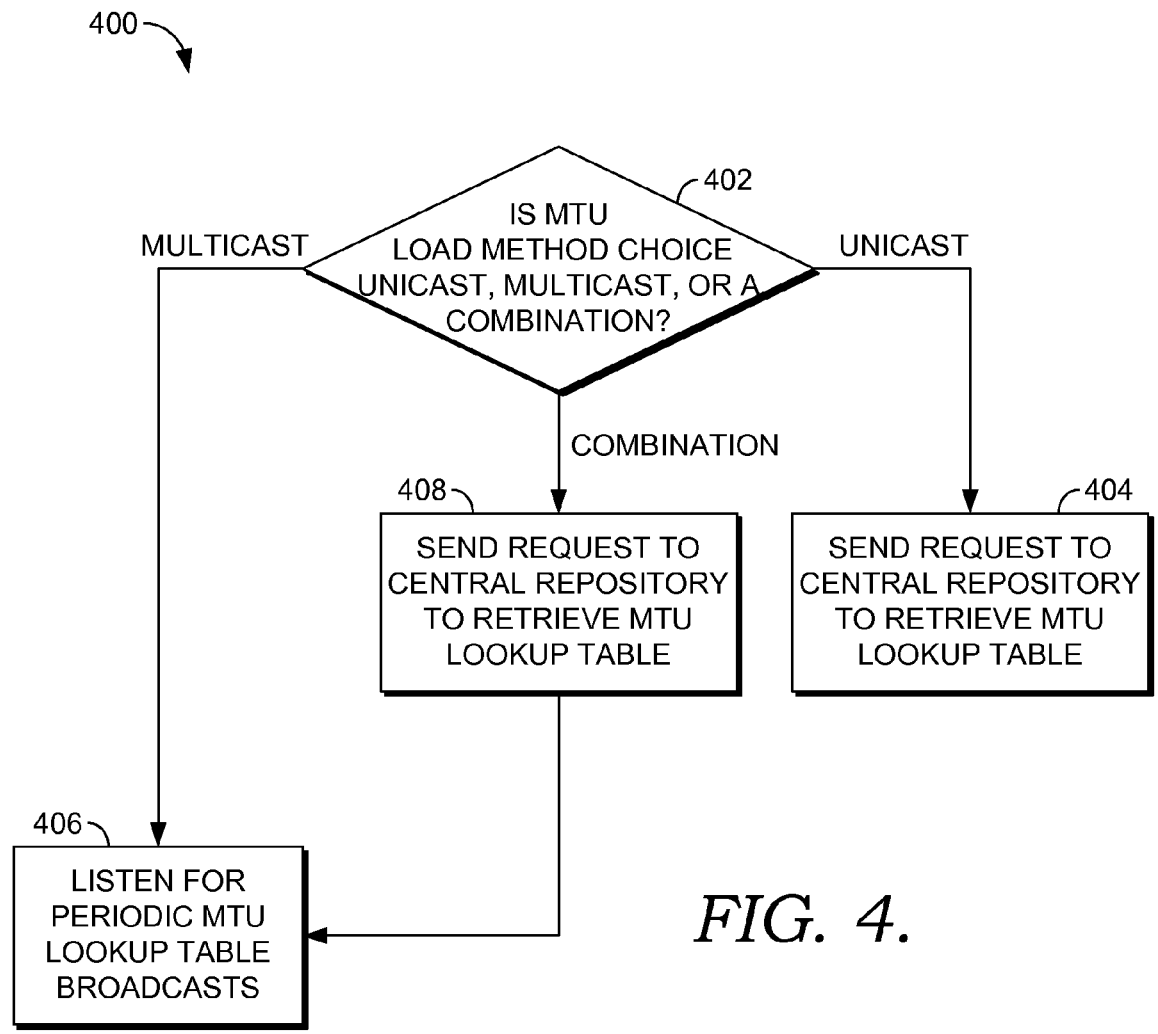
FIG. 4 is a flow chart of a method for loading MTU lookup table information based on MTU load choice.

A method 400 in some embodiments for loading MTU information from the MTU lookup table in the central repository is illustrated in FIG. 4. In step 402, it is determined if the MTU load method choice is unicast, multicast, or a combination of unicast and multicast. The unicast method choice in step 404 includes sending a request to the central repository to retrieve the MTU lookup table. The multicast method choice in step 406 includes listening for periodic MTU lookup table broadcasts from the central repository. The combination method includes first sending a request to the central repository to retrieve the MTU lookup table in step 408 and then listening for periodic MTU lookup table broadcasts from the central repository in step 406. In some embodiments, only one MTU load method is available. Other MTU load method choices are contemplated. Each of the unicast, multicast, and combination methods may also include time to live (TTL) after which the values received from the MTU lookup table in the central repository must be updated because they are no longer valid. In certain embodiments, the TTL defaults to about approximately 300 seconds.

Figure 5:
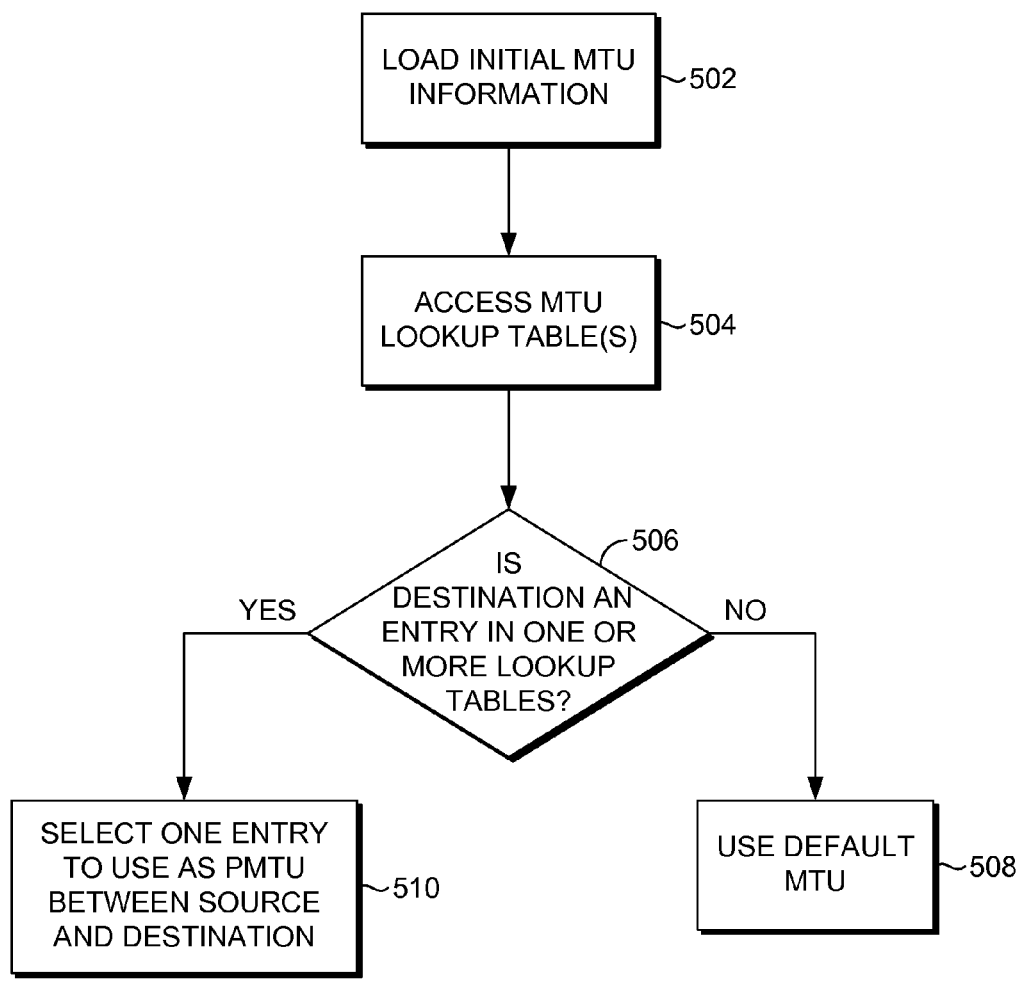
FIG. 5 is a flow chart of a method for determining a destination host PMTU.

FIG. 5 illustrates a method 500 for determining a destination host PMTU. In step 502, initial MTU information is loaded. The MTU information may be initialized as described with reference to FIGS. 3 and 4. In step 504, the source host accesses one or more MTU lookup tables. The MTU lookup tables may be in the local host file, on the central repository, or in the central repository of a different zone, and may be dynamically updated. In some embodiments, the central repository of the source host's zone exchanges MTU lookup table information with central repositories of different zones.

In step 506, it is determined whether an IP address subnet prefix of the destination host is an entry in the one or more MTU lookup tables. If not, a default MTU value is set as the PMTU between the source host and the destination host in step 508. If an IP address subnet prefix of the destination host is an entry in one or more MTU lookup tables, then one entry is selected and set as the PMTU between the source host and the destination host in step 510.

Figure 6:
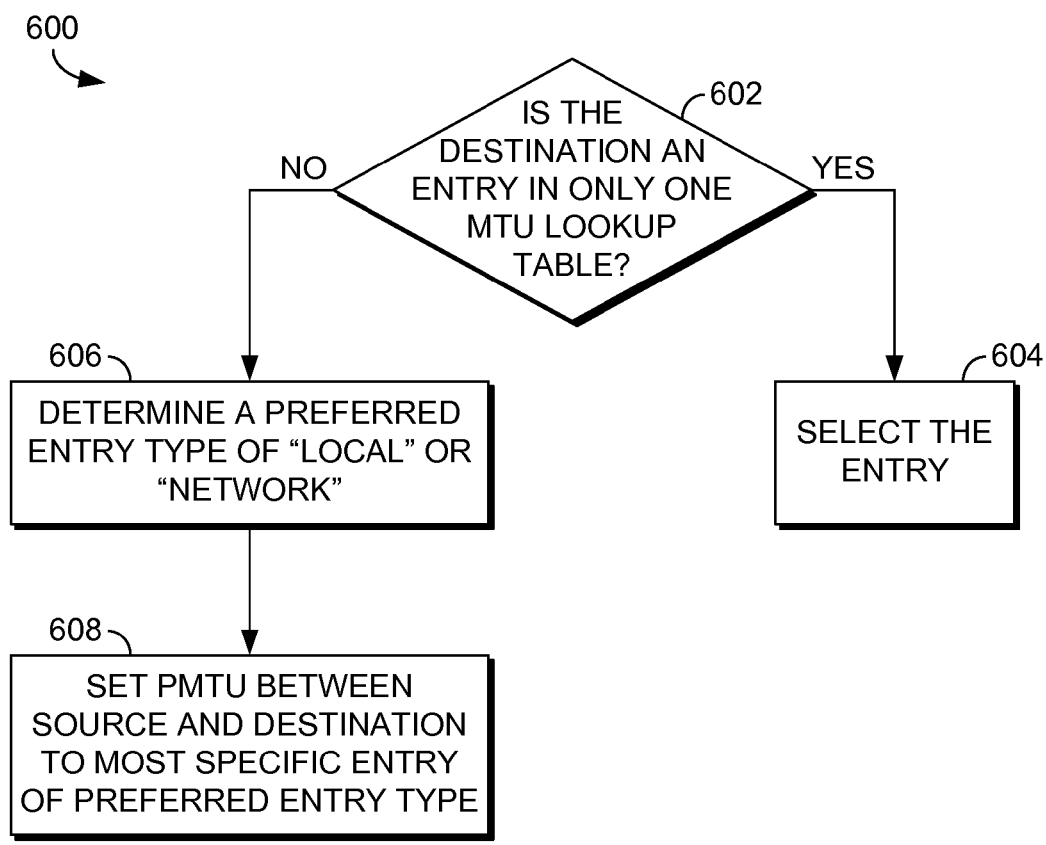
FIG. 6 is a flow chart of a method for selecting one entry to use as the PMTU between a source host and a destination host.

Entry selection through any number of processes is contemplated. FIG. 6 illustrates a method 600 for selection of an MTU entry as the PMTU in one embodiment. In step 602, it is determined if an IP address subnet prefix of the destination host is an entry in only one lookup table. If it is, the entry is selected and set as the PMTU between the source host and the destination host in step 604. Although a more specific entry may be preferable, because only one entry has been identified, that entry is used. If more than one entry is identified, in step 606 it is determined if a preferred entry type of "Local" or "Network" is indicated. The PMTU value between source and destination is then set to the most specific entry of the preferred entry type in step 608.

Figure 7:
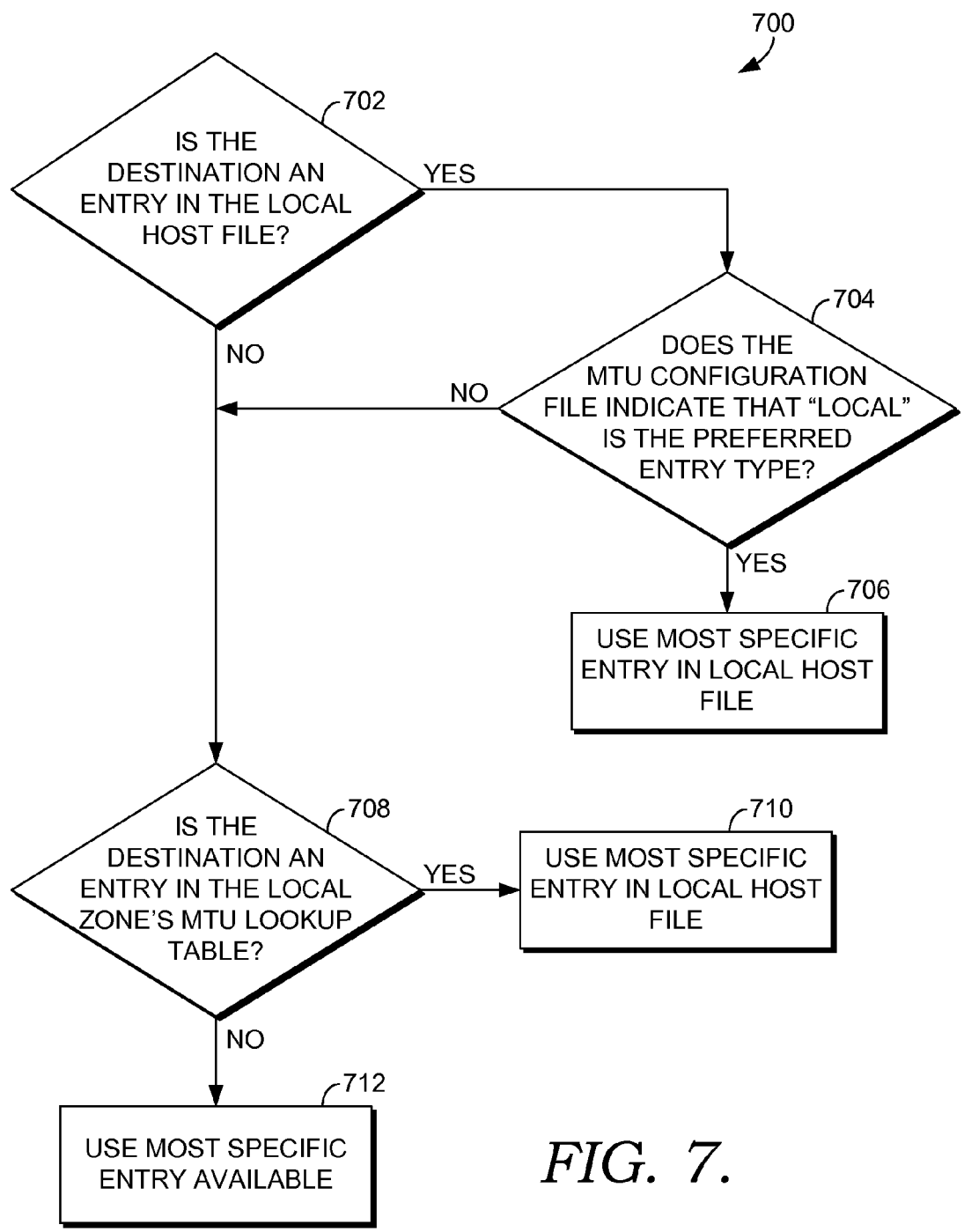
FIG. 7 is a flow chart of a method for determining a preferred entry type and setting PMTU between a source host and a destination host to the most specific entry for the preferred entry type.

In one embodiment, steps 606 and 608 are implemented as illustrated by the method 700 in FIG. 7. In step 702, it is determined if an IP address subnet prefix of the destination host is an entry in the local host file. If so, it is then determined in step 704 if the MTU configuration file indicates (or indication otherwise occurs) that "Local" is the preferred entry type, as discussed above. If "Local" is the preferred entry type, then the PMTU value for the path between the source host and the destination host is set to the value of the most specific MTU entry in the local host file in step 706. If "Local" is not indicated to be the preferred entry type in the MTU configuration file (or indication otherwise occurs), or if an IP address subnet prefix of the destination host is determined not to be an entry in the local host file, then it is determined in step 708 if an IP address subnet prefix of the destination host is an entry in the MTU lookup table in the central repository of the local zone.

If at least one local zone entry does exist, the most specific local zone entry is selected and set as the PMTU for the path between the source host and the destination host in step 710. If there is not a local zone entry, the most specific entry available is used in step 712. The preference for local zone entries in steps 708, 710, and 712, gives greater weight to information from the local zone because it can likely be more highly trusted. MTU table entries received from different zones may be "spoofed" or contain erroneous data that the source host zone is unable to detect. Other embodiments do not give preference to local zone entries and may instead use the most specific entry available.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:
1. One or more computer storage media having computer-useable instructions embodied thereon for performing a method for determining a destination host path maximum transmission unit (PMTU), the method comprising:

from a source host, accessing one or more MTU lookup tables each having a plurality of entries, wherein at least one MTU lookup table includes entries for destination hosts, subnets, and networks, each entry having a corresponding entry MTU value;

upon determining that one or more internet protocol (IP) address subnet prefixes of a destination host are entries in the one or more MTU lookup tables, selecting the corresponding entry MTU value of one of the entries to use as the PMTU between the source host and the destination host by:

when an IP address subnet prefix of the destination host is an entry in only one lookup table, setting the PMTU between the source host and destination host to the corresponding entry MTU value; and when an IP address subnet prefix of the destination host is an entry in a plurality of lookup tables:
determining a preferred entry type of either local or network, and
setting the PMTU between the source host and destination host to the entry MTU value of the entry in the plurality of lookup tables that is the preferred entry type and is the most specific IP address subnet prefix,
wherein the IP address subnet prefixes of the destination host specify one of: the destination host, a subnet in which the destination host is located, or a network in which the destination host is located; and upon determining that an IP address subnet prefix of the destination host is not an entry in the one or more lookup tables, setting the PMTU between the source host and the destination host to a default value.

2. The media of claim 1, further comprising loading initial MTU information.

3. The media of claim 1, wherein at least one MTU lookup table is stored on the source host.

4. The media of claim 1, wherein at least one MTU lookup table is located on a central repository.

5. The media of claim 4, wherein the at least one MTU lookup table located on the central repository is dynamically updated.

6. The method of claim 4, wherein the central repository exchanges MTU lookup table information with a central repository in a different zone than the source host.

7. The media of claim 4, wherein at least one MTU lookup table is located on a central repository in a different zone than the source host.

8. The media of claim 1, wherein determining a preferred entry type of either local or network comprises accessing an MTU configuration file and reading an indicated preference.

9. The media of claim 1, wherein when an IP address subnet prefix of the destination host is an entry in a plurality of lookup tables further comprises:
upon determining that network is the preferred entry type and that one of the entries is a local zone entry, setting the PMTU between the source host and the destination host to the entry MTU value of the local zone entry that is the most specific IP address subnet prefix.

10. One or more computer storage media having a system embodied thereon including computer-executable instructions that, when executed, perform a method for determining a path maximum transmission unit (PMTU), the system comprising:
a central repository component containing an MTU lookup table containing Internet protocol (IP) address subnet prefix entries for destination hosts, subnets, and networks,
wherein each entry has a corresponding entry MTU value, and
wherein the MTU lookup table is populated through at least one of: receiving broadcasts from devices brought online, manual population, experimental discovery, and receiving information from a central repository in a different zone;

an MTU initialization component on a source host that loads local and network MTU information associated with an IP address subnet prefix of a destination host,
wherein the MTU initialization component loads local MTU information from a local host file, and
wherein the MTU initialization component loads network information from the central repository; and a PMTU selection component on a source host that identifies a preferred entry for which the corresponding entry MTU value is selected as the PMTU between the source host and the destination host, wherein upon determining that one or more IP address subnet prefixes of the destination host are entries in either the MTU lookup table on the central repository or one or more additional MTU lookup tables, the PMTU selection component selects the corresponding entry MTU value of one of the entries as the PMTU between the source host and the destination host by:

when an IP address subnet prefix of the destination host is an entry in only one lookup table, setting the PMTU between the source host and destination host to the entry MTU value, and when an IP address subnet prefix of the destination host is an entry in a plurality of lookup tables:
determining a preferred entry type of either local or network, and
setting the PMTU between the source host and destination host to the entry MTU value of the entry in the plurality of lookup tables that is the preferred entry type and is the most specific IP address subnet prefix,
wherein the IP address subnet prefixes of the destination host specify one of: the destination host, a subnet in which the destination host is located, or a network in which the destination host is located.

11. The media of claim 10, further comprising a reporting component that transmits information received in Internet control message protocol (ICMP) error messages to the central repository component.

12. The media of claim 10, wherein the MTU lookup table on the central repository is dynamically updated.

13. The media of claim 10, wherein determines a preferred entry type of either local or network comprises accessing an MTU configuration file and reading an indicated preference.

14. One or more computer storage media having computer-useable instructions embodied thereon for performing a method for determining a destination host path maximum transmission unit (PMTU), the method comprising:
loading initial MTU information, including one or more Internet protocol (IP) address subnet prefixes and corresponding MTU values, by:
from a source host, reading a preferred entry type indicator;
upon determining that the preferred entry type indicator is empty:
reading an MTU load method choice from a DHCP server transmission, and
loading MTU information from an MTU lookup table in a central repository using the MTU load method choice, wherein the MTU lookup table includes entries for destination hosts, subnets, and networks, each entry having a corresponding entry MTU value;

upon determining that the preferred entry type indicator contains a local entry type, loading MTU information for an IP address subnet prefix of a destination host from a local host file; and upon determining that the preferred entry type indicator contains a network entry type:

reading an MTU load method choice from the local host file upon determining that the central repository contains an entry for an IP address subnet prefix of the destination host, reading an MTU load method choice from a DHCP server transmission upon determining that the central repository does not contain an entry for an IP address subnet prefix of the destination host, and loading MTU information from the MTU lookup table in the central repository using the MTU load method choice;

from the source host, accessing the initial MTU information;

upon determining that one or more IP address subnet prefixes of the destination host are included in the initial MTU information, selecting the corresponding MTU value of one of the IP address subnet prefixes to use as the PMTU between the source host and the destination host, wherein the IP address subnet prefixes of the destination host specify one of: the destination host, a subnet in which the destination host is located, or a network in which the destination host is located; and upon determining that an IP address subnet prefix of the destination host is not included in the initial MTU information, setting the PMTU between the source host and the destination host to a default value.

15. The method of claim 14, wherein the preferred entry type indicator is an MTU configuration file.

16. The method of claim 14, wherein the MTU information loaded from the local host file has a time to live (TTL).

17. The method of claim 14, wherein the MTU load method choice comprises one of unicast, multicast, or a combination of unicast and multicast, wherein the unicast method includes sending a request to the central repository to retrieve the MTU lookup table, wherein the multicast method includes listening for periodic MTU lookup table broadcasts from the central repository, and wherein the combination of unicast and multicast includes sending a request to the central repository to retrieve the MTU lookup table and listening for periodic MTU lookup table broadcasts from the central repository.

18. The method of claim 17, wherein the MTU lookup table information retrieved has a time to live (TTL).

* * * * *